United States Patent Office 2,875,842
Patented Mar. 3, 1959

2,875,842

STEERING MECHANISM FOR LIFT TRUCKS

John P. Morrell, Wheaton, Ill.

Application February 1, 1957, Serial No. 637,653

4 Claims. (Cl. 180—64)

My invention relates to improvements in power driven material handling lift trucks and similar devices.

My invention relates more particularly to improved steering mechanism for hydraulic lift trucks and similar devices.

This application relates to improvements in the steering mechanism for hydraulic lift trucks of the type shown and described in my co-pending application for patent Serial No. 619,205, filed October 30, 1956, now Patent No. 2,799,417.

The principal object of the present invention is to provide improved steering mechanism for a hydraulic lift truck of the type which has a pair of front wheels that are motor driven, the motor normally receiving its power from storage batteries on the truck, and the steering mechanism thereof being derived from a pair of pivotally mounted rear wheels. In this type of lift truck a single steering wheel is provided adjacent the front end of the truck, the same being connected by means of an endless chain to a pair of sprockets adapted to rotate the kingpin or vertical axis of the steering wheels located adjacent the back end of the truck.

With the sprockets for rotating the steering wheels mounted axially of the kingpin upon which the steering wheels are supported, I have found that in directing the truck to the right or to the left, one of the steering wheels will be frictionally rotated on the floor to compensate for the shorter radius in which the wheel will turn when the truck is steered to the right or to the left. For example, when the truck is steered to the left, the left steering wheel will be turned on a shorter radius and at a more acute angle than the right steering wheel, and the same situation prevails with respect to the right steering wheel when a turn is made to the right. Thus with the chain driven sprockets for rotating the kingpin and steering wheel mounted axially on the kingpin, one or the other of the steering wheels is frictionally twisted on the floor while the other is going through the normal radius at which the turn is made.

In order to overcome this difficulty and to effect smoother operation of the entire steering mechanism, I have mounted the chain driven sprockets eccentrically on the kingpin, the offset being such that when the steering rod is rotated to the right or to the left, the right or left steering wheel will be rotated at a higher rate of speed than the other, with the result that the right or left wheel will be turned on its kingpin at a greater rate of speed, thus automatically compensating for the difference between the radii on which the two steering wheels are rotated when a turn is made.

For a more complete understanding of the principle involved and the mechanism for effecting the operation of the same, reference is had to the accompanying drawings upon which:

Figure 1:
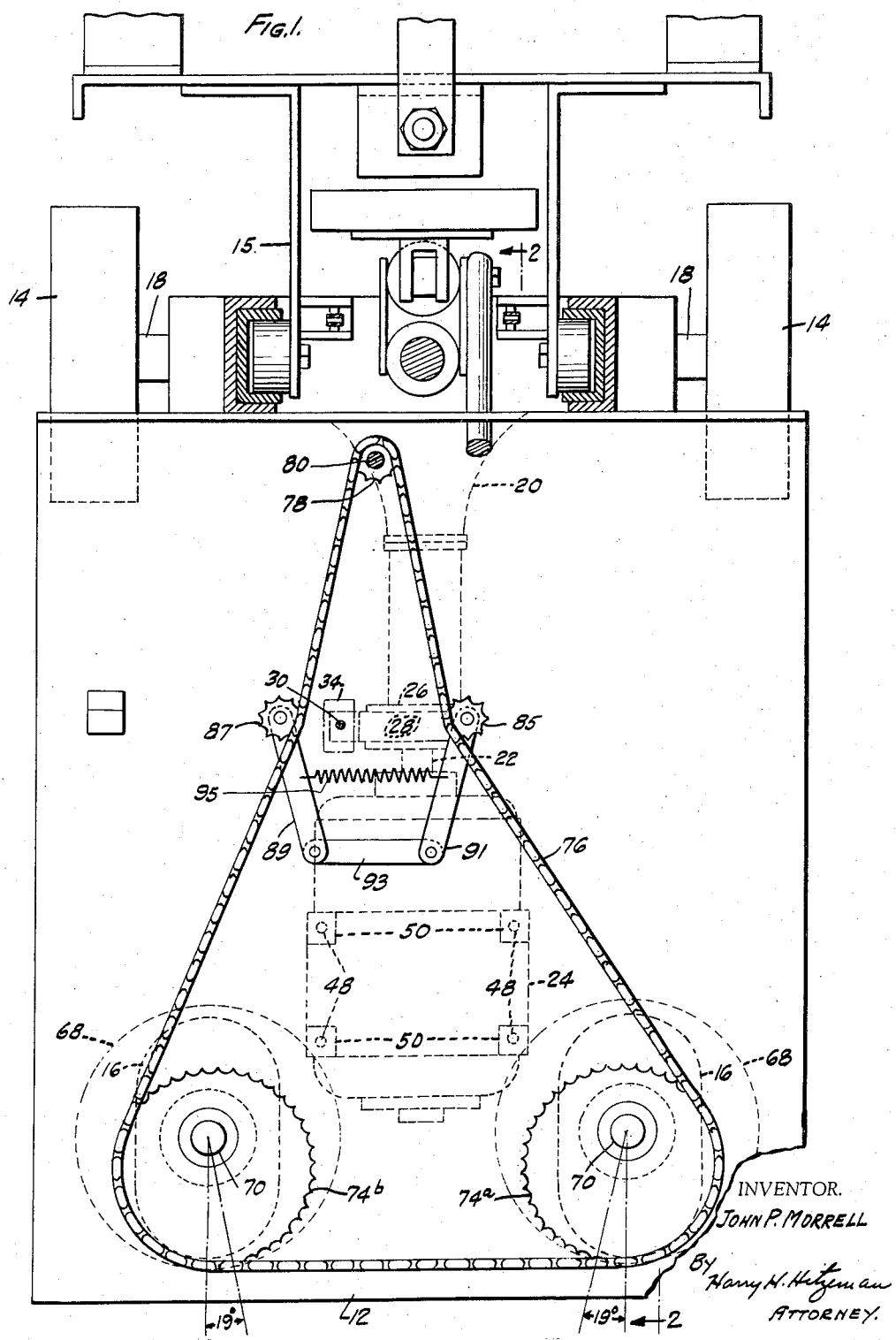
Fig. 1 is a plan sectional view showing generally a hydraulic lift truck assembly to which the steering mechanism has been applied.
Figure 2:
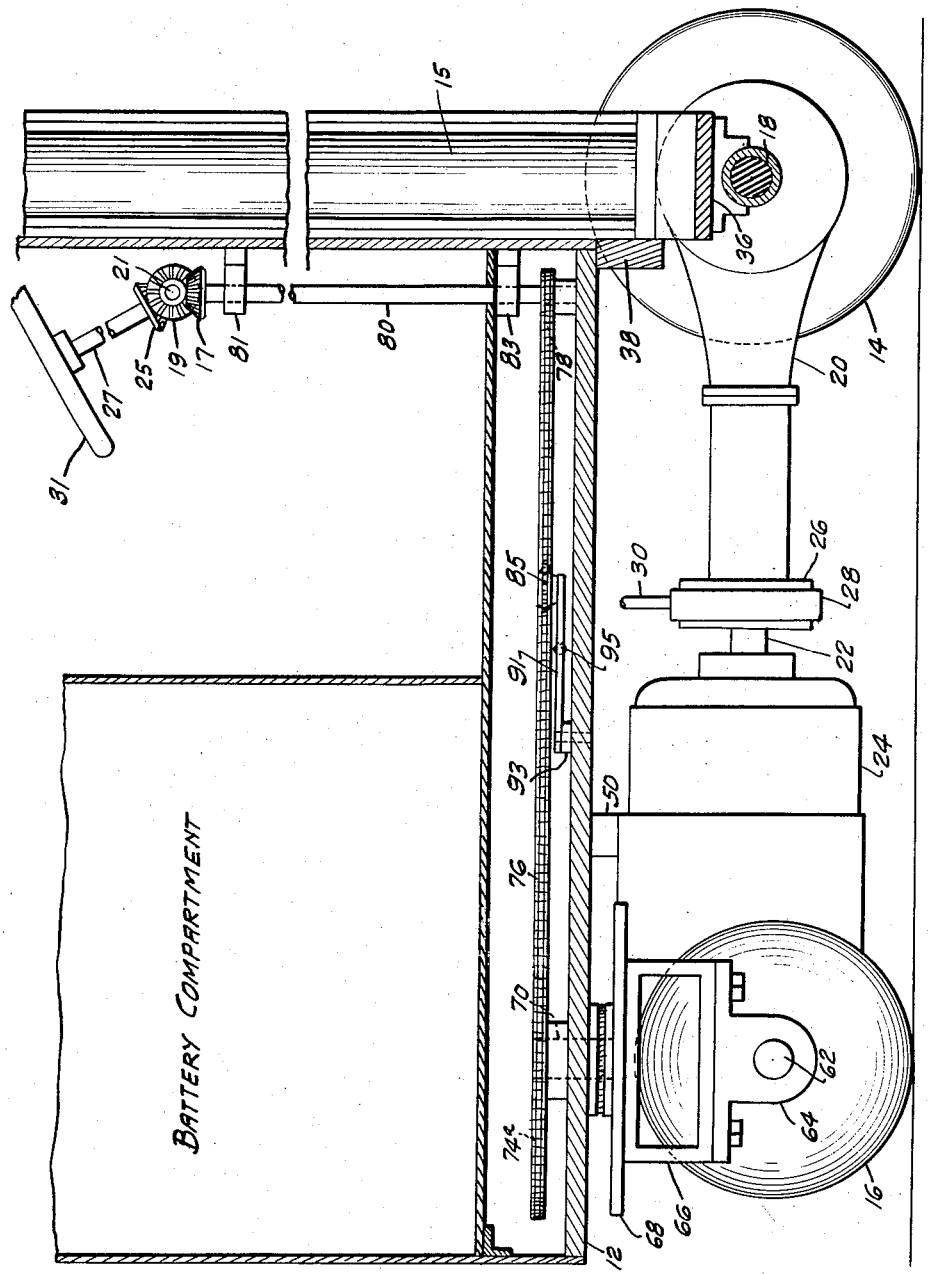
Fig. 2 is a fragmentary vertical cross-sectional view of the same taken generally on the line 2—2 of Fig. 1.
Figure 3:
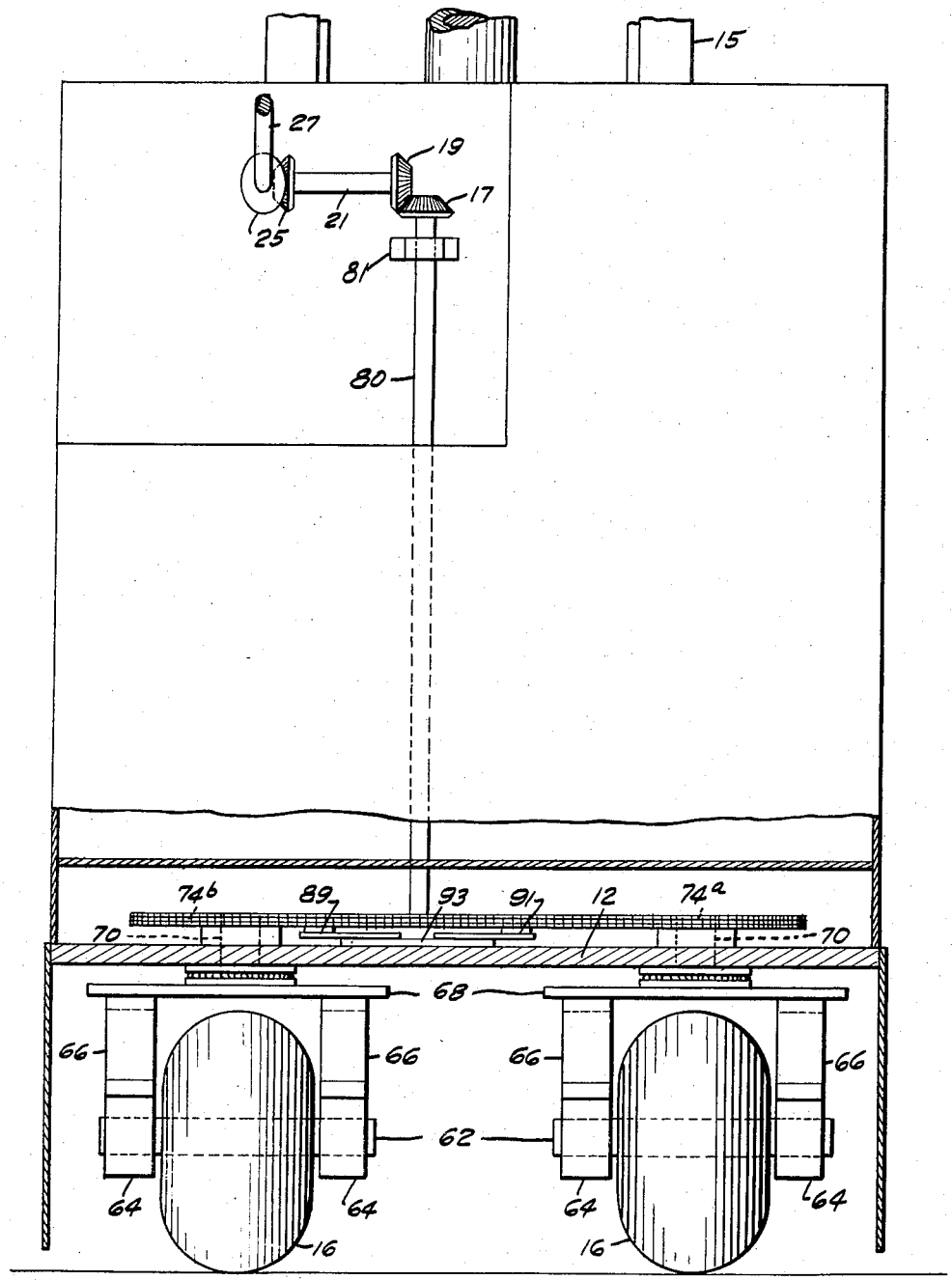
Fig. 3 is a back elevational view with parts broken into section to show the location of the steering post and associated driving chain sprockets and steering wheels.

In the embodiment of the invention which I have chosen to illustrate and describe the same, the lift truck may generally include a floor 12 which is supported by means of a pair of front wheel members 14 and rear or steering wheel members 16. The front wheels 14 are mounted upon a pair of front axles 18 which extend from a differential 20, the differential 20 being connected by a drive shaft 22 coming from an electric motor 24. The shaft 22 is provided between the differential and the motor with a brake drum 26, the brake drum 26 having the usual brake band 28 operated by a lever 30 from a floor pedal 34. Thus a braking operation is effected by stepping on the pedal 34.

The motor 24 is mounted below the floor by suitable bolt members 48 which pass through spacer blocks 50 to support the motor spaced a short distance below the bottom of the floor 12 and in direct alignment with the differential 20. The differential 20 is connected to a base plate member 36 which is fastened to a front plate 38 below the front edge of the floor 12, the plate 36 also serving as a support for the mast 15 and associated parts, as is more fully described in my co-pending application hereinbefore referred to.

The rear wheels 16 each have an axle 62 that is journaled in bearings 64 on both sides of the wheel, the bearings 64 being connected to a standard 66 which is provided upon its upper face with a disc 68. The disc 68 carries a kingpin assembly 70 mounted in an opening 72 in the floor, so that the wheels 16 may rotate about the kingpin 70 therein.

Sprocket wheels 74a and 74b may be fastened above the floor 12, one to each of the kingpins 70, the sprocket wheels being eccentrically mounted as shown. In a specific embodiment of the invention, the sprocket wheels may have sixty teeth and be 0.54" pitch diameter, being mounted off center 1½" and at an angle of 19 degrees from parallel center lines of the steering wheels 16.

The steering column 80 which is mounted in suitable bearing brackets 81 and 83 may carry a ten-toothed pinion. In order to provide for placing the steering column at any desired point other than medially of the two steering wheels 16, I provide a pair of idler sprockets 85 and 87 carried by a pair of pivotally mounted arms 89 and 91 mounted on a fixed bracket 93. A tension spring 95 normally holds both idler sprockets 87 in tension against the chain 76, thus providing, as shown, an equiangular relationship between the steering wheel sprocket 78 and the idler sprockets 85 and 87. It is believed to be apparent that if the steering column 80 were directly between the steering wheels 16, no idler sprockets would be required except to take up slack in the chain.

With the construction as shown, when it is desired to turn to the left, the sprocket 74a will turn on a greater radius than the sprocket 74b, thus swinging the wheel 16 beneath the sprocket 74a through a smaller arc than the wheel beneath the sprocket 74b. The same situation applies when a turn is made to the right, and this of course is due to the axes of the sprockets 74a and 74b being eccentric or offset from the center of the kingpins.

The steering post 80 may be connected by bevel gears 17 and 19 to a cross-shaft 21 which carries a bevel gear 23 that meshes with a similar bevel gear 25 on an angularly disposed shaft 27 to which the steering wheel 31 is attached.

With the above construction, it can be seen that when it is desired to make a turn with a four-wheeled vehicle of the type described and equipped with a pair of rear steering wheels, that the angle of turn is automatically compensated for due to the eccentric mounting of the sprockets above each of the steering wheels on the kingpins 70.

While in the foregoing description specific dimensions have been given as to a specific installation, it will be understood that this is for purposes of illustration only and to demonstrate the principle which is involved. I contemplate that changes and modifications may be made in the exact details shown and I do not wish to be limited in any particular; rather what I desire to secure and protect by Letters Patent of the United States is:

1. A power driven lift truck including a horizontally disposed floor, a horizontal axle at the front of said floor, a pair of front wheels at the ends of said axle, a motor mounted below said floor in driving relation to said axle, a similar pair of wheels mounted adjacent the back of said floor, said back wheels each having a mounting assembly including a kingpin positioned for rotation in the floor of said lift truck, a steering wheel near the front of said floor, a vertically disposed shaft extending downwardly from said steering wheel, a pinion on the end of said shaft, sprockets on the kingpins of each of said back wheels, a chain trained about said sprockets and said pinion, said sprockets being eccentrically mounted on said kingpins, and a pair of pivotally mounted idler sprockets engaging said chain at positions equi-distant on both sides of said pinion, said sprockets on said kingpins positioned at equal angles from the axis of said kingpins, said idler sprockets so positioned that they provide an equi-angular relationship between the idler sprockets and the steering wheel sprocket and permit the location of the steering wheel other than medially of the back wheels.

2. A power driven wheeled vehicle including a horizontally disposed floor having a horizontal axle at the front of the same, a pair of front wheels at the ends of said axle, a motor in driving relation to said axle, a similar pair of wheels mounted adjacent the back of said floor, said back wheels each having a mounting assembly including a kingpin positioned for rotation in the floor of said vehicle, a steering wheel adjacent the front end of said vehicle, a vertically disposed shaft extending downwardly from said steering wheel, a pinion on the end of said shaft, sprockets on the kingpin of each of said back wheels and a chain trained about said sprockets and said pinion, said sprockets being eccentrically mounted on said kingpins, and a pair of pivotally mounted spring-connected idler sprockets engaging said chain at positions equi-distant on both sides of said pinion.

3. A power driven lift truck including a horizontally disposed floor, a horizontal axle at the front of said floor, a pair of front wheels at the ends of said axle, a motor mounted below said floor in driving relation to said axle, a similar pair of wheels mounted adjacent the back of said floor, said back wheels each having a mounting assembly including a kingpin positioned for rotation in the floor of said lift truck, a steering wheel near the front end of said floor, a vertically disposed shaft extending downwardly from said steering wheel, a pinion on the end of said shaft, sprockets on the kingpins of each of said back wheels, a chain trained about said sprockets and said pinion, said sprockets being eccentrically mounted on said kingpins, and a pair of pivotally mounted idler sprockets engaging said chain at positions equi-distant on both sides of said pinion, said sprockets on said kingpins positioned at equal angles from the axis of said kingpins, said idler sprockets so positioned that they provide an equi-angular relationship between the idler sprockets and the steering wheel sprocket and permit the location of the steering wheel other than medially between the back wheels, pivotally mounted levers for mounting said idler sprockets and spring means connected between said levers.

4. An automotive vehicle having a fixed front axle adjacent the forward end of the same, a pair of front wheels on said axle, a motor, a drive from said motor to said axle, a pair of kingpins mounted near the back of said vehicle, a wheel mounted for horizontal rotation on each of said kingpins, a steering wheel adjacent the front of said vehicle, a vertically disposed shaft extending down from said steering wheel, a pinion at the lower end of said shaft, horizontally disposed sprockets on the kingpin of each of said back wheels, and a chain trained about said sprockets and said pinion, said sprockets being eccentrically mounted on said kingpins at an angle of approximately 19 degrees at positions on both sides of said pinions, and a pair of pivotally mounted idler sprockets between said steering wheel pinion and said back wheel sprockets, said idler sprockets so positioned that they provide an equi-angular relationship between the idler sprockets and the steering wheel sprocket, and springs connected between said idler sprockets for holding said chain taut whereby the location of the steering wheel other than medially between the back wheels may be effected.

References Cited in the file of this patent

UNITED STATES PATENTS

| 493,354 | Degenhardt | Mar. 14, 1893 |
| 935,610 | Mauksch | Sept. 28, 1909 |
| 1,382,909 | Hennessy et al. | June 28, 1921 |
| 2,423,266 | Stokes | July 1, 1947 |
| 2,631,045 | McElhinney et al. | Mar. 10, 1953 |